United States Patent [19]

O'Dell

[11] 4,394,143

[45] Jul. 19, 1983

[54] PROTECTIVE SPARK ELIMINATING SYSTEM FOR A FILTER BAGHOUSE

[75] Inventor: Leonard J. O'Dell, Louisville, Ky.

[73] Assignee: Allis-Chalmers Corporation, Milwaukee, Wis.

[21] Appl. No.: 394,851

[22] Filed: Jul. 2, 1982

[51] Int. Cl.³ ............................................. B01D 50/00
[52] U.S. Cl. ..................................... 55/261; 110/119; 110/217; 55/319; 55/338; 55/418; 55/459 R; 55/472; 55/DIG. 14; 55/DIG. 20; 55/438
[58] Field of Search ............... 110/119, 120, 121, 125, 110/127, 145, 160, 203, 216, 217; 55/261, 318, 319, 325, 337, 338, 397, 398, 418, 445, 459 R, 466, 472, DIG. 14, DIG. 20, 438

[56] References Cited

U.S. PATENT DOCUMENTS

| | | | |
|---|---|---|---|
| 2,472,636 | 6/1949 | Weissman | 55/445 |
| 3,071,916 | 1/1963 | Westlin | 55/338 |
| 3,791,110 | 2/1974 | Klein et al. | 55/338 |
| 3,897,739 | 8/1975 | Goldbach | 110/216 |
| 3,926,595 | 12/1975 | Bockman | 55/418 |
| 4,205,614 | 6/1980 | Good | 110/216 |
| 4,237,800 | 12/1980 | Kullendorff et al. | 55/337 |

Primary Examiner—Henry C. Yuen
Attorney, Agent, or Firm—Thomas G. Anderson

[57] ABSTRACT

A protective spark eliminating system for removing burning particulates from flue gases prior to introducing the gases into a filter baghouse. The protective system includes a housing enclosing a separating chamber having a gas inlet in the side of the housing for directing a stream of flue gases into the housing, and a gas outlet in the top of the housing for conducting the flue gas stream out of the chamber. To effect separation and removal of the burning particulates from the gas stream, the housing is provided with a secondary gas system which is adapted to maintain a downwardly flowing curtain of gas across the width of the flue gas inlet to direct the burning particulates in the flue gases downwardly into a hopper at the base of the housing as the flue gases enter the chamber. Then, as the flue gas stream flows through the chamber and out of the housing to the baghouse, the particulates are drawn out of the hopper in a secondary gas stream which is directed through an inertial separator to remove the particulates and circulated back to the housing where it is injected across the width of the flue gas inlet to maintain the process.

11 Claims, 4 Drawing Figures

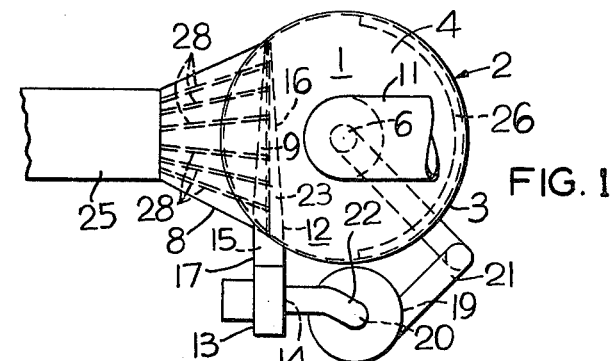
FIG. 1
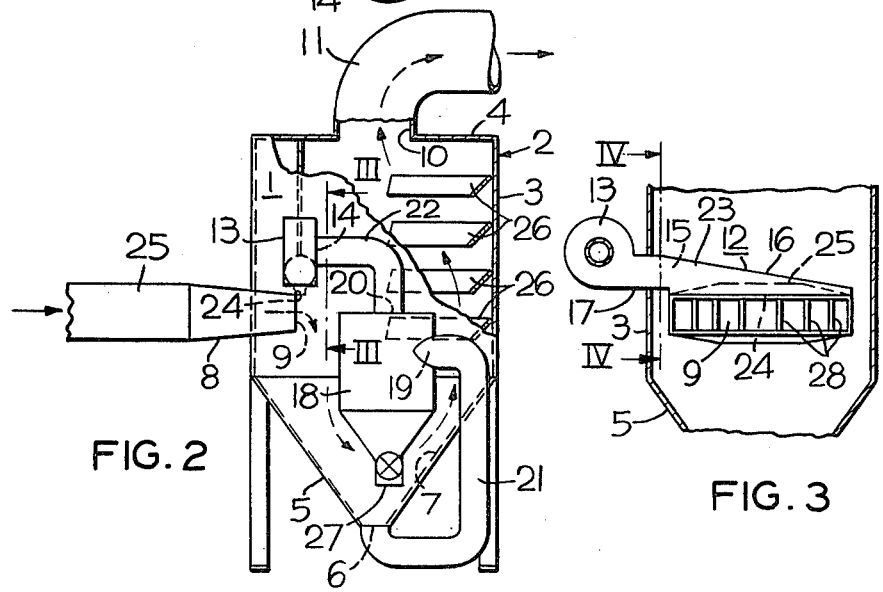
FIG. 2
FIG. 3
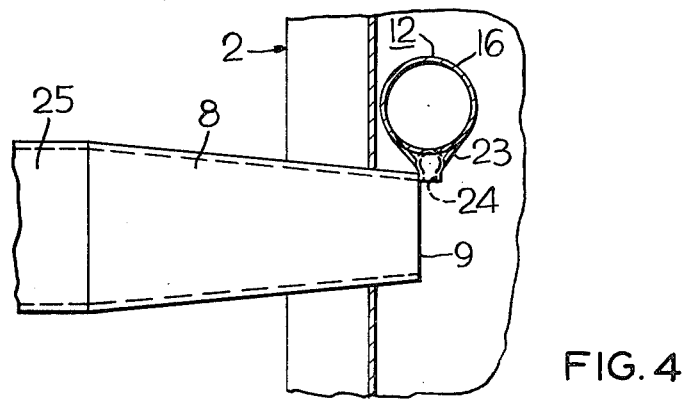
FIG. 4

PROTECTIVE SPARK ELIMINATING SYSTEM FOR A FILTER BAGHOUSE

BACKGROUND OF THE INVENTION

1. Field of the Invention

The present invention relates to a spark eliminating system for removing burning particulates from a hot gas stream.

2. Description of the Prior Art

One of the recurring problems in a baghouse installation for filtering flue gases generated by large industrial incinerators used to dispose of trash and garbage is the possibility of fire in or on the filter media. This occurs as a result of the sparklets burning particulates entrained in the flue gases being deposited on the filter bags as the flue gases flow into the baghouse. In the past, a variety of methods have been used to pretreat the flue gases to abate this problem including passing the gases through wire mesh screening or directing the flue gases through a series of baffles or similar arrrangement. However, most of those arrangements have been relatively complex or difficult to maintain and have met with only limited success.

SUMMARY OF THE INVENTION

The present invention relates to a protective spark eliminating system for removing sparklets or other burning particulates from hot flue gases prior to introducing them into a filter baghouse, and in particular, to an eliminating system wherein a secondary gas stream effects separation of the particulates from the gas stream and then removes them from the system.

The protective spark eliminating system includes a housing enclosing a separating chamber having a gas inlet in the side of the housing for directing a stream of flue gases into the chamber, a gas outlet in the top of the housing for conducting the flue gas stream out of the chamber, and a hopper having a discharge outlet enclosing the bottom of the chamber at the base of the housing. To effect separation and removal of the burning particulates from the gas stream, the housing is provided with a secondary gas system which is adapted to circulate a gas stream forming a curtain of gas across the width of the flue gas inlet to direct the burning particulates downwardly into the hopper as the flue gases enter the chamber. Thus, as the flue gas stream flows through the chamber and out of the housing through the outlet at the top of the chamber, the particulates in the hooper are entrained in the secondary gas stream and conveyed out of the housing to an inertial separator where they are removed and disposed of in the conventional manner while the gases cleaned by the separator are drawn through a blower and directctd back to the housing where they are injected across the width of the flue gas inlet to maintain the process.

From the foregoing, it can be seen that the invention contemplates a relatively straightforward and easily maintained protective arrangement which significantly reduces the chance of sparklets or burning particulates being carried into the filter compartment of a baghouse used to filter hot flue gases; however, it is to be understood that various changes can be made in the arrangement, form and construction of the apparatus disclosed herein without departing from the spirit and scope of the invention.

DESCRIPTION OF THE DRAWINGS

FIG. 1 is a plan view of the protective spark eliminating system;

FIG. 2 is a front elevational view, partially in section, of the system shown in FIG. 1;

FIG. 3 is an enlarged partial sectional view taken along line III—III in FIG. 2; and FIG. 4 is a view taken along line IV—IV in FIG. 3.

DESCRIPTION OF THE PREFERRED EMBODIMENT

As shown in the drawings, the spark eliminating system 1 includes a housing 2 having an outer side wall 3, a top section 4 enclosing the top of the housing 2, and a hopper 5 having a discharge outlet 6 enclosing the bottom of the housing 2 to form a separating chamber 7. The housing 2 has an inlet duct 8 for the hot flue gases spaced from the top section 4 which projects into the separating chamber 7 to provide a hot gas inlet 9 for directing the flue gases into the chamber 7, and a gas outlet duct 10 in the top section 4 providing an outlet for conducting the flue gases out of the chamber into a duct 11 adapted to convey them to a baghouse (not shown) where they are cleaned in the conventional manner prior to being discharged into the atmosphere. The spark eliminating system 1 includes a secondary gas system 12 adopted to circulate a secondary gas stream through the chamber 7 across the width of the gas inlet 9 so the flue gases enter the chamber 7 sparklets or other burning particulates are directed downwardly toward the hopper 5 and removed through the discharge outlet 6. The secondary gas system 12 includes a blower 13 having a gas inlet 14 and a gas outlet 15, an elongated gas nozzle 16 connected by a first duct 17 to the blower outlet 15, a cyclone or similar inertial separator 18 having a dirty gas inlet 19 and a clean gas outlet 20, a second duct 21 connecting the gas inlet 19 of the separator 18 to the discharge outlet 6, and a third duct 22 connecting the gas outlet 20 to the blower inlet 14. Additionally, as shown in FIGS. 3 and 4, the gas nozzle 16 includes a tubular header pipe 23 having a slot 24 extending along its length which is aligned above the hot gas duct 8 so that the slot 24 extends across the entire width of the hot gas inlet 9. In this regard, it should be noted that the header pipe 23 is of a tapered cross-sectional configuration of a diminishing cross section sized to maintain a relatively uniform gas flow out of the pipe 23 along the entire length of the slot 24.

Referring to FIGS. 1 and 2, the gas inlet duct 8 to diverges outwardly to form the hot gas inlet 9. As shown in FIG. 4, the gas inlet 9 is of an essentially horizontal elongated cross-sectional configuration having a cross-sectional area greater than the conduit 25 conveying the flue gases to the housing 2. This arrangement serves to minimize the horizontal velocity of the flue gases as they enter the chamber 7 to maximize the separating effect of the gas curtain formed by the secondary gas stream flowing downwardly across the width of the inlet 9. Additionally, in order to maintain a relatively uniform flow of flue gases across the entire width of the inlet 9, a plurality of equally spaced, longitudinally extending diverging vanes 28 are secured across the interior of the duct to divide and stabilize the flow as it approaches the inlet 9. This is similarly believed to enhance the separating effectiveness of the secondary gas stream since it promotes uniform separation of the particulates across the entire width of the inlet 9.

From the foregoing, it can be seen that as the flue gases flow into the chamber 7, the secondary gas stream deflects it downwardly so sparklets and other burning particulates tend to drop to the bottom of the hopper 5 as the flue gases turn upwardly to flow out of the chamber as shown schematically by the arrows in FIG. 2. This type of flow is maintained within the chamber 7 by sizing the blower 13 and the nozzle 16 so the volumetric flow rate of the secondary gas stream is in the range of 10–20 percent of the volumetric flow rate of the hot flue gases entering the chamber 7 through the inlet 9 so the velocity of the secondary gas stream is in the range of 3–5 times the velocity of the entering flue gases. For example, in a case where the flue gases are flowing into the chamber 7 at a rate of 30,000 m$^3$/hr. at a velocity of 7–8 m/sec., the secondary gas stream should be flowing across the inlet 9 at about 5,000 m$^3$/hr. at a velocity of about 25 m/sec. This serves to deflect the incoming flue gases to promote inertial separation of the burning particulates as the stream of flue gases turns upwardly to flow out of the chamber 7, while at the same time causing it to flow along a plurality of vertically aligned horizontal baffles 26 projecting into the chamber 7 from the wall 3 of the housing opposite the gas inlet 9. The baffles 26, which slope downwardly at about a 60 degree slope and extend around approximately one-half of the interior periphery of the housing, serve to further entrap and capture the burning particulates, which in turn drop into the hopper 5 as the flue gases flow toward the outlet 10.

As noted above, the invention also provides for continually removing the separated particulates from the housing. This is effected by the blower 13 which draws the secondary gas stream through the discharge outlet 6 of the hopper 5 so the particulates separated from the flue gases are carried along with the gases to the cyclone separator 18 where they are removed and disposed of in the conventional manner through a discharge outlet 27 provided in the base of the separataor whereafter the clean gases are directed back to the nozzle 16 of the blower 13 via ducts 17 and 22.

The embodiments of the invention in which an exclusive property or privilege is claimed are defined as follows:

1. A protective spark eliminating system for removing burning particulates from a hot gas stream, comprising:
    a housing having an outer side wall defining a separating chamber within the housing, a top section enclosing the top of the housing, and a hopper having a bottom outlet enclosing the bottom of the housing;
    a hot gas inlet duct spaced from the top section projecting through the side wall into the chamber providing a hot gas inlet for directing the hot gas stream into the chamber;
    a gas outlet duct in the top section of the housing providing an outlet for directing the hot gas stream out of the chamber; and
    a secondary gas system adapted to circulate a secondary gas stream through the chamber including a blower having a gas inlet and a gas outlet, a gas nozzle connected to the outlet of the blower aligned above thegas inlet duct adapted to maintain a localized gas curtain flowing downwardly across the width of the hot gas inlet, an inertial separator having a gas inlet and a gas outlet, means connecting the gas inlet of the inertial separator to the outlet of the hopper, and means connecting the outlet of the inertial separator to the inlet of the blower; whereby
    burning particulates in the hot gas stream are directed downwardly by the gas curtain as the hot gas stream enters the separating chamber whereafter the downwardly descending particulates are entrained in the secondary gas stream as it flows to the inertial separator where the particulates are removed from the gas stream which is in turn drawn into the inlet of the blower and directed back to the separating chamber.

2. The spark eliminating system of claim 1, and
    said gas inlet duct diverging outwardly to form the hot gas inlet, said inlet being of an essentially horizontal elongated cross-sectional configuration.

3. The spark eliminating system of claim 2, and
    said gas inlet duct having a plurality of longitudinally extending diverging vanes equally spaced across the interior of the duct adapted to maintain a relatively uniform flow in the hot gas stream across the width of the duct.

4. The spark eliminating system of claim 1, and
    said gas nozzle including a header pipe aligned above the hot gas duct having a slot extending across the hot gas inlet through which the secondary gas stream is directed to form the gas curtain.

5. The spark eliminating system of claim 4, and
    said header pipe being of a tapered configuration having a gas inlet on one end and closed on its other end wherein the cross-sectional area of the pipe diminishes along the length of the pipe toward its closed end to maintain a uniform gas flow through said slot across the width of the hot gas pipe.

6. The spark eliminating system of claim 1, and
    a plurality of vertically aligned downwardly sloping baffle plates on the side wall of the housing projecting into the separating chamber opposite the hot gas inlet adapted to entrap particulates in the hot gas stream flowing upwardly through the chamber.

7. The spark eliminating system of claim 1, and
    said blower being sized to maintain the volumetric flow rate of the secondary gas stream in the range 10–20 percent of the volumetric flow rate of the hot gas stream entering the separating chamber through the hot gas inlet.

8. The spark eliminating system of claim 7, and
    said nozzle being sized to maintain the velocity of the secondary air stream as it leaves the nozzle in the range of 3–5 times the velocity of the hot gas stream in the hot gas inlet.

9. The spark eliminating system of claim 1, and
    said housing being of a vertically cylindrical configuration.

10. The spark eliminating system of claim 1, and
    said housing being of a generally rectangular horizontal cross-sectional configuration.

11. The spark eliminating system of claim 1, and
    said inertial separator being a cyclone separator.

* * * * *